Patented Aug. 12, 1952

2,606,917

UNITED STATES PATENT OFFICE 2,606,917

PREPARATION OF NITRILES

James K. Dixon, Riverside, Conn., assignor to American Cyanamid Company, New York, N. Y., a corporation of Maine No Drawing. Application June 29, 1951, Serial No. 234,469

7 Claims. (Cl. 260—465)

The present invention relates to an improved method of preparing nitriles.

In my Patents Nos. 2,553,404, 2,553,405, and 2,553,406, I disclosed that when cyanogen chloride or cyanogen bromide is heated with various aromatic and aliphatic compounds at a temperature of at least 525° C. the materials react to form a nitrile, hydrogen chloride or bromide being split off. According to these disclosures when an aromatic compound containing replaceable hydrogen such as benzene or an incompletely halogenated benzene is reacted with cyanogen chloride or cyanogen bromide at high temperatures, a cyanogen group is placed on the aromatic ring. When the material contains an alkyl or aliphatic radical containing replaceable hydrogen, however, the cyano group adds to the said radical. For example, if toluene and cyanogen chloride are reacted together in a hot tube, —CN adds to the methyl carbon to form phenylacetonitrile. Further in accordance with the aforesaid disclosures, when cyanogen chloride is heated with an aliphatic nitrile containing replaceable hydrogen such as acetonitrile, the product is malononitrile.

When using rather large quantities of materials and larger reactors, difficulty is sometimes experienced in heating the reaction tube adequately. It has been found for example that when using larger tubes, some or all of the tube must be heated to a temperature considerably in excess of reaction temperature in order to provide the average temperature necessary within the tube. This frequently results in local overheating causing partial decomposition of one or more of the reagents and/or product and consequent reduction in yield. In several instances a crust of carbon builds up in the reaction tube, and starts polymer formation at a very fast rate, necessitating shutdown for cleaning the tube. This phenomenon is particularly likely to occur when using a metal reaction tube.

In part, the present invention is directed at a novel method for supplying heat to the reactions of the aforesaid patents which avoids the above-mentioned disadvantages of a radiant heating system.

It is an object of the present invention to heat the reactants by means of a superheated inert vapor, in particular steam. It is a further object of the invention to provide a means for conducting the aforesaid reactions with a minimum deposition of carbon on the walls of the reaction vessel. Additional objects will be apparent from the discussion hereinafter.

In accordance with the instant invention the reactants are heated by admixing them with an inert preheated vapor rather than by heating the reaction tube itself. Any inert vapor such as carbon dioxide, nitrogen, or the like is suitable, but steam is preferred owing to its low cost.

It is quite surprising that steam could be used as a means for supplying heat to the reaction without resulting in the destruction of the cyanogen halide reactant, either in the reaction tube or in the condensate. According to Van Cleave and Mitton, "The reaction of cyanogen chloride with water in the presence of hydrogen chloride has been shown to proceed quantitatively according to the equation

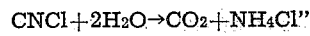

$$CNCl + 2H_2O \rightarrow CO_2 + NH_4Cl''$$

(The hydrolysis and polymerization of cyanogen chloride in the presence of hydrogen chloride, Canadian Journal of Research, vol. 25, sec. B., pages 430–439, at page 438, published in 1947.)

Notwithstanding such predictable unsuitability, however, steam gives excellent results.

In carrying out the process of this invention, it is preferred that the reactants be preheated to a temperature somewhat below reaction temperature and that the inert vapor be preheated somewhat above reaction temperature, so that the final temperature within the reaction vessel will be within the desired range.

*Example 1*

Toluene and cyanogen chloride are fed into a quartz reaction tube in the ratio of 2 mols of toluene to 1 mol of cyanogen chloride. Both reactants are separately preheated to 500° C. before introducing them into the reactor. Preheated steam, in the ratio of 14.1 mols of water to 1 mol of cyanogen chloride, is simultaneously fed into the reactor. The steam is preheated to a temperature that provides an average value of about 635° C. ±10° C. within the reaction tube. It is necessary to heat this steam to a temperature of about 775° C. in order to provide a temperature of about 635° C. for the total vapors in the reaction tube. Contact time in the tube is 7 seconds. The reaction product is run into a cooled condensing system in which the desired phenylacetonitrile is collected along with unconverted toluene, cyanogen chloride, and condensed water. The phenylacetonitrile is recovered from this mixture by fractional distillation. In this run the yield of phenylacetonitrile based on the cyanogen chloride reacted amounts to about 59%, or on the basis of the toluene reacted, about 57%.

Example 2

In a run analogous to the above commercial xylene is used in place of toluene. The reaction is carried out at 650° C. ±8° C. The contact time is 8.9 seconds and the mol ratio of xylene to cyanogen chloride to steam is respectively 2.2:1:15.5. In this case in order to provide the average reaction temperature of 650° C. it is necessary to preheat the steam to about 770° C. when the xylene and cyanogen chloride are each heated separately to about 550° C. In this run 38% of the cyanogen chloride is consumed and the yield of nitriles based on cyanogen chloride consumed is 64%.

Example 3

For one series of runs a reaction chamber was prepared in the following way. Expanded metal lath of the type used in making plaster walls was formed into a cylinder 4" wide x 30" high. Alumina refractory cement was then applied to the lath from the outside to an interior depth of about ½". The refractory cement was smoothed on the inside of cylinder so that all exposed metal surfaces were thoroughly covered. The cylinder so formed was provided with three quartz inlet ports at the top for the introduction of cyanogen halide, organic reactant, and heating medium. These three inlet ports were so placed as to lie in the same horizontal plane at an angle of 120° from each other. Thermocouple wells were provided along the wall of the chamber about 10" apart. The top and bottom of the cylinder was formed of the same material (lath and alumina cement), and a quartz outlet was provided near the bottom of the cylinder. A second shell of metal lath 8" in diameter was placed around the vessel proper, and the annular gap between the two filled with pellets of rock wool insulation. The assembly was also similarly insulated at the bottom and at the top. After the cement was thoroughly set, the reaction chamber was heated by passing a stream of hot air through one of the upper ports, starting at about 100° C. and gradually increasing to about 650° C. over a period of several hours. When the thermocouples showed that the entire vessel was at a temperature of about 650° C. ± 10°, the air was shut off, and the nitrogen preheater was brought up to the same temperature and the chamber was flushed with hot nitrogen. The nitrogen preheater was then heated to supply nitrogen at about 780°–790° C. while simultaneously introducing through the other inlet ports α-methylnaphthalene and cyanogen chloride, each preheated to about 510° C., the three materials being introduced at a rate such that the mol ratio of α-methylnaphthalene to cyanogen chloride to nitrogen is approximately 2:1:24.8. A residence time of about 9 seconds is satisfactory. The effluent is condensed and the nitrogen recovered in a gas trap for reuse. The desired product, 1-napthaleneacetonitrile, is distilled from the remaining condensate in an amount equal to about a 40% conversion of the cyanogen chloride used.

The following table is representative of other reactions using cyanogen chloride and the apparatus of Example 3.

| | Expt. 4 | Expt. 5 | Expt. 6 | Expt. 7 |
|---|---|---|---|---|
| Organic reactant (A) | Ethylbenzene | Diphenylmethane | Toluene | Acetonitrile |
| Heat supplier (B) | $N_2$ | Steam | Steam | $CO_2$ |
| Mol ratio ClCN:A:B | 1:2:19.9 | 1:3:63.2 | 4:3:30 | 1:3:7.2 |
| Temp. of ClCN added, °C | 525 | 500 | 475 | 520 |
| Temp. of organic reactant, °C | 525 | 500 | 475 | 520 |
| Temp. of heat supplier, °C | 730 | 790 | 840 | 815 |
| Av. temp. in chamber | 625 | 640 | 655 | 650 |
| Av. residence time, sec | 4 | 5.5 | 8 | 6 |
| Nitrile formed | Phenylacetonitrile [1] | Diphenylacetonitrile | Phenylaceto and phenylmalononitriles [2] | Malononitrile |
| Conversion of ClCN to nitrile, percent | 28 | 62 | Not quantitatively recorded | 16.5 |

[1] The ethyl side chain is apparently degraded in this reaction.
[2] Excess ClCN over toluene gives good yield of both above nitriles. Presumably φ acetonitrile is partly converted to φ malononitrile.

In conducting the process of the invention on a commercial scale the reactor can be constructed of virtually any material stable at the temperature employed. It is preferred however to construct the reactor of an inert substance such as quartz, Vycor (a high silica heat-resistant glass), alumina, silicon carbide, fire brick or the like. If desired, the interior of a metal vessel can be lined with such materials.

Various temperature combinations can of course be used to produce the final reaction temperature, and suitable initial temperatures can easily be calculated from the known specific heats of the reagents and of the heat supplier. In general the gram-specific heats are roughly the same at the temperatures used. Of course, the appropriate heat-supplier temperature can also be determined by simple experiment.

In one modification, the reactants are individually preheated with a super-heated supplier to the desired reaction temperature and then admixed in the reactor.

While the above examples all used cyanogen chloride, cyanogen bromide can be used equally well.

In the claims, the term "alkylaromatic compound" is intended to comprehend members of the benzene series carrying an alkyl side chain, such as ethylbenzene, methyl naphthalene, and the like.

While the invention has been described with particular reference to specific embodiments, it is to be understood that it is not to be limited thereto but is to be construed broadly and restricted solely by the scope of the appended claims.

I claim:

1. In the method of preparing a nitrile that comprises heating a member of the group consisting of benzene, halobenzenes, alkylaromatic compounds, and aliphatic nitriles containing a replaceable hydrogen with a cyanogen halide of the group consisting of cyanogen chloride and cyanogen bromide at a temperature of at least 525° C., the improvement that comprises supplying heat to the reaction by means of admixing with the said reactants a superheated inert vapor, whereby the temperature of the reaction mass is brought within the range of 525° to 800° C.

2. The method according to claim 1 in which cyanogen chloride is the cyanogen halide reactant, and the inert superheated vapor comprises steam.

3. The method according to claim 1 in which toluene and cyanogen chloride are heated at least in part by preheated water vapor to form a reaction mass having a temperature within the approximate range 525° to 800° C., whereby phenylacetonitrile is produced.

4. The method according to claim 1 in which xylene and cyanogen chloride are heated at least in part by preheated water vapor to a temperature within the approximate range 525° to 800° C., whereby methylphenylacetonitrile is formed.

5. The method according to claim 1 in which benzene and cyanogen chloride are heated at least in part by preheated water vapor to a temperature within the approximate range 525° to 800° C., whereby benzonitrile is formed.

6. The method according to claim 1 in which acetonitrile and cyanogen chloride are heated at least in part by preheated water vapor to a temperature of 525° to 800° C., whereby malononitrile is formed.

7. The method according to claim 3 in which the cyanogen chloride is in stoichiometric excess over toluene, whereby a mixture of phenylacetonitrile and phenylmalononitrile is formed, and separating the said two nitriles by fractional distillation.

JAMES K. DIXON.

No references cited.